United States Patent
Park (10) Patent No.: US 8,436,794 B2
(45) Date of Patent: May 7, 2013

(54) METHOD OF OPTIMIZING BRIGHTNESS OF LIQUID CRYSTAL DISPLAY PANEL

(75) Inventor: Jin-woo Park, Seoul (KR)

(73) Assignee: Samsung Display Co., Ltd. (KR)

( * ) Notice: Subject to any disclaimer, the term of this patent is extended or adjusted under 35 U.S.C. 154(b) by 1184 days.

(21) Appl. No.: 11/851,676

(22) Filed: Sep. 7, 2007

(65) Prior Publication Data

US 2008/0158241 A1  Jul. 3, 2008

(30) Foreign Application Priority Data

Jan. 2, 2007  (KR) ........................ 10-2007-0000367

(51) Int. Cl.
*G09G 3/36* (2006.01)
*G09G 5/10* (2006.01)
*G06F 3/038* (2006.01)

(52) U.S. Cl.
USPC ................. 345/87; 345/88; 345/90; 345/204; 345/207; 345/690

(58) Field of Classification Search ..................... 345/87, 345/207, 690, 697, 589
See application file for complete search history.

(56) References Cited

U.S. PATENT DOCUMENTS

| | | | |
|---|---|---|---|
| 5,764,209 A * | 6/1998 | Hawthorne et al. | 345/87 |
| 2005/0157298 A1 * | 7/2005 | Evanicky et al. | 356/416 |

FOREIGN PATENT DOCUMENTS

| | | |
|---|---|---|
| JP | 2000-187215 | 7/2000 |
| JP | 2006-171683 | 6/2006 |
| KR | 1996-5161 | 2/1996 |
| KR | 2001-85279 | 9/2001 |
| KR | 2005-94771 | 9/2005 |
| KR | 2006-6613 | 1/2006 |

OTHER PUBLICATIONS

Office Action issued in corresponding Korean Patent Application No. 2007-0000367 dated Nov. 27, 2007.
Notice of Allowance issued by Korean Intellectual Property Office on May 28, 2008 in Korean Patent Application No. 2007-367.
Abstract of Korean Patent Publication No. 100154769 B1.

* cited by examiner

*Primary Examiner* — Alexander Eisen
*Assistant Examiner* — Mark Regn
(74) *Attorney, Agent, or Firm* — Knobbe, Martens, Olson & Bear, LLP (57) ABSTRACT

A device and a method of optimizing brightness of a liquid crystal display panel includes a plate to mount a target liquid crystal display panel, a back light to provide light to the liquid crystal display panel, a connecting unit to connect to a pad unit of the liquid crystal display panel, a detecting unit to produce a brightness signal by detecting a brightness of a predetermined region of the liquid crystal display panel, a converting unit to convert the brightness signal into a brightness data, a comparative unit to store a standard data and to compare the brightness data with the standard data, and a processing unit to produce an operation voltage according to a result signal provided by the comparative unit and to provide the operation voltage to the connecting unit, wherein the detecting unit detects the brightness by concentrating light of sight angle range is ±10° or below.

17 Claims, 5 Drawing Sheets

METHOD OF OPTIMIZING BRIGHTNESS OF LIQUID CRYSTAL DISPLAY PANEL

CROSS-REFERENCE TO RELATED APPLICATION

This application claims the benefit of Korean Application No. 2007-367, filed Jan. 2, 2007 in the Korean Intellectual Property Office, the disclosure of which is incorporated herein by reference.

BACKGROUND OF THE INVENTION

1. Field of the Invention

Aspects of the present invention relate to a device and a method of optimizing brightness of a liquid crystal display panel, and more particularly, to a device and a method of establishing or determining the optimum brightness of a liquid crystal display panel during a fabricating process thereof.

2. Description of the Related Art

With the growth of the information and communication industries, there has been an increasing demand for display devices which are small, light weight, thin, possessing high resolution, and driven at a low power. According to the increasing demand for such display devices, liquid crystal display devices which use an organic light emitting feature have been developed.

Liquid crystal display devices display characters and letters by using an electro-optic property of a liquid crystal. Liquid crystal display devices have several advantages due to their excellent color reproducibility, low power consumption, and thinness. Accordingly, liquid crystal display devices are being used widely.

Liquid crystal display devices are generally classified as a passive matrix type and an active matrix type. The passive matrix type liquid crystal display includes a super twisted-nematic (STN) liquid crystal display device, and the active matrix type liquid crystal display includes a thin film transistor (TFT) liquid crystal display device. The passive matrix type liquid crystal display device includes a liquid crystal display panel having a liquid crystal layer that is injected between two substrates on which electrodes are disposed to be crossing each other. A back light is placed in a lower part of the liquid crystal display panel to be used as a light source. A drive integrated circuit (IC) drives the liquid crystal display panel.

However, the liquid crystal display panels have non-uniform thicknesses depending on materials, process variables, errors, and so on. Further, the liquid crystal display panels have irregular brightnesses despite being subjected to identical voltage conditions caused by differences in the refraction angles of liquid crystals. Accordingly, the liquid crystal display panels require a process to control the respective operating voltage (Vop) of the liquid crystal display panel during each fabricating process to display characters and letters with an optimum brightness.

In related liquid crystal display panels, the brightness of the liquid crystal display panel is controlled to correspond to a standard brightness of a standard liquid crystal display panel after the standard brightness of the standard liquid crystal display panel is recognized or determined. However, such a control method is highly dependant on production workers and leads a difference in quality and a decrease in the productivity thereof.

In order to solve such problems, one method that detects the brightness of each part of the liquid crystal display panel by using several sensors, and controls an operating voltage thereof according to an average value of the detected brightness. However, the method is difficult in controlling the brightness thereof uniformly and accurately since the amount of light from each part is irregular, and properties of each sensor are different.

SUMMARY OF THE INVENTION

An aspect of the present invention is to provide a device and method of optimizing brightness of a liquid crystal display panel.

The device which optimizes a brightness of the liquid crystal display panel according to an aspect of the present invention includes a plate to mount the liquid crystal display panel, a back light to supply light to the liquid crystal display panel, a connecting unit to connect to a pad unit of the liquid crystal display panel, a detecting unit to produce a brightness signal by detecting a brightness of a predetermined region of the liquid crystal display panel being illuminated by the provided light, a converting unit to convert the brightness signal into a brightness data, a comparative unit to store a standard brightness data and to compare the brightness data with the standard brightness data, and a processing unit to produce an operation voltage of the liquid crystal display panel according to the result signal of the comparison of the brightness data with the standard brightness data provided from the comparative unit, and to provide the operation voltage to the pad unit via the connecting unit.

The method of optimizing brightness of the liquid crystal display panel according to another aspect of the present invention includes producing a standard brightness signal by detecting a brightness of a predetermined region from a standard liquid crystal display panel, converting the standard brightness signal into a standard brightness data, storing the standard brightness data, producing a measured brightness signal by detecting a brightness of a predetermined region from a target liquid crystal display panel, converting the measured brightness signal into a measured brightness data, comparing the measured brightness data with the standard brightness data, storing an operation voltage corresponding to the measured brightness data into a driving unit of the target liquid crystal display panel if the measured brightness data and the standard brightness data are identical, and producing another measured brightness signal taking account of a gap between the measured brightness data and the standard brightness data after producing the measured brightness data and providing the another operation voltage corresponding to the another measured brightness signal to the target liquid crystal display panel if the measured brightness data and the standard brightness data are not identical.

According to an aspect of the present invention, a device to optimize a brightness of a liquid crystal display panel includes a detector to detect a brightness of a light emitted from a portion of the liquid crystal display panel, the brightness of the light corresponding to an input voltage to modulate the light, a processor to compare the detected brightness relative to a standard brightness, to selectively set the input voltage as an operating voltage of the liquid crystal display panel if the detected brightness is substantially identical to the standard brightness of a standard liquid crystal display based on the comparison, and to selectively change the input voltage by an amount corresponding to a difference between the detected brightness and the standard brightness if the detected brightness is not substantially identical.

According to an aspect of the present invention, a method of optimizing brightness of a liquid crystal display panel includes detecting a brightness of a light emitted from a portion of the liquid crystal display panel, the brightness of the light corresponding to an input voltage to modulate the light, comparing the detected brightness relative to a standard brightness, selectively setting the input voltage as an operating voltage of the liquid crystal display panel if the detected brightness is substantially identical to the standard brightness such that a brightness of the liquid crystal display meets a brightness of a standard liquid crystal display based on the comparison, and selectively changing the input voltage by an amount corresponding to a difference between the detected brightness and the standard brightness if the detected brightness is not substantially identical.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to aspects of the present invention, examples of which are illustrated in the accompanying drawings, wherein like reference numerals refer to the like elements throughout. The aspects are described below in order to explain the aspects of the present invention by referring to the figures.

In the aspects, when one element is connected to another element, one element may be not only directly connected to another element but also indirectly connected to another element via another element.

Figure 1:
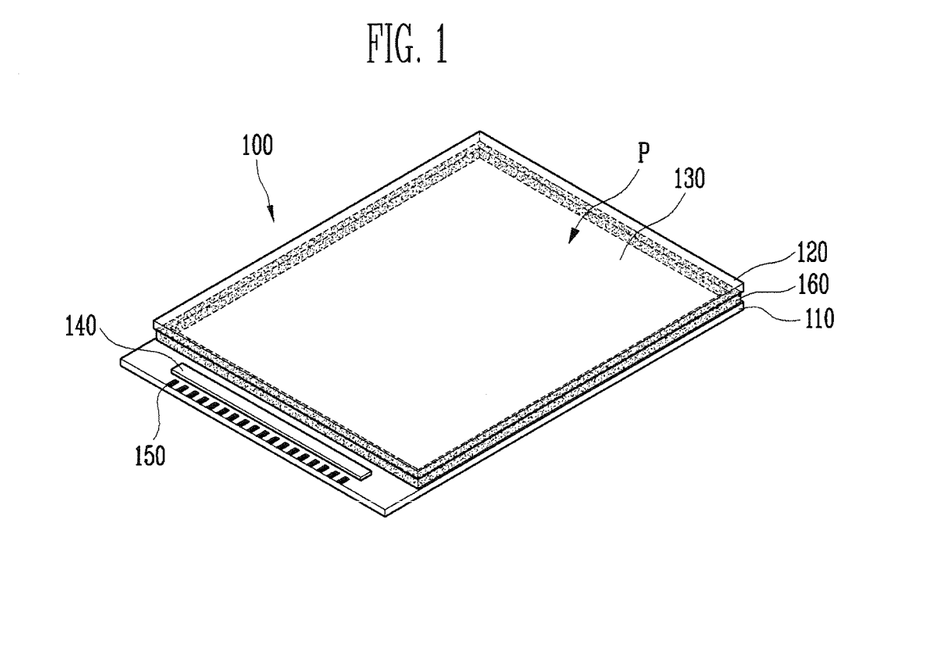
FIG. 1 is a perspective view illustrating a liquid crystal display panel according to one aspect of the present invention.
Figure 4:
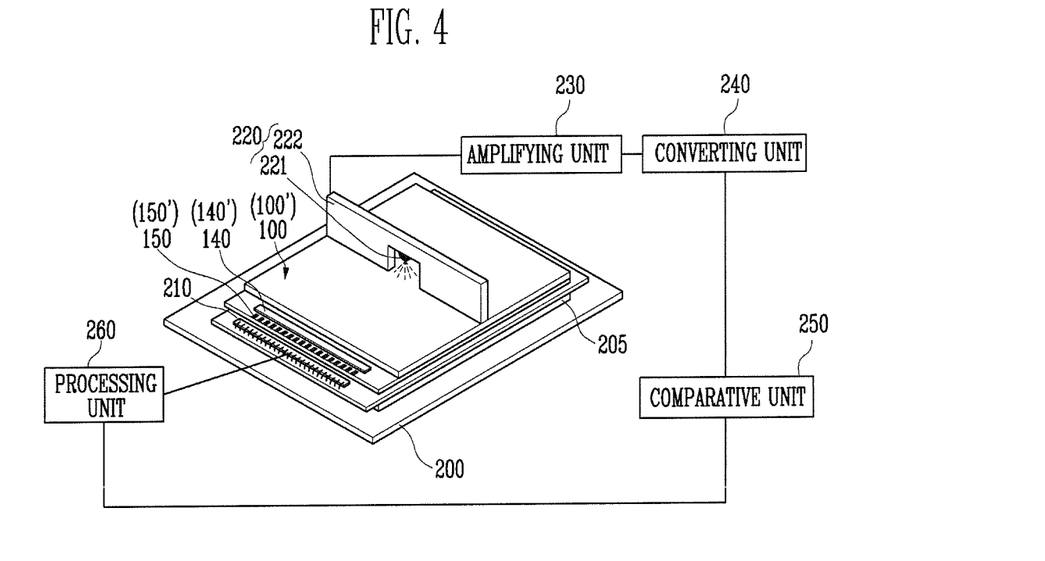
FIG. 4 is a schematic view illustrating a device to optimize a brightness of a liquid crystal display panel according to an aspect of the present invention.

FIG. 1 is a perspective view illustrating a liquid crystal display panel 100 according to one aspect of the present invention. The liquid crystal display panel 100 includes a lower substrate 110 and an upper substrate 120 that are positioned to be opposite to each other. A liquid crystal layer 130 is disposed between the lower substrate 110 and the upper substrate 120. Also, a driving unit 140 to drive the liquid crystal display panel 100 is mounted around a pixel region P of the lower substrate 110. The driving unit 140 also controls or receives an electric signal provided thereto from the outside through a pad unit 150, so that the electric signal is provided to the liquid crystal display panel 100. In the aspect shown, the illustration of the liquid crystal panel is shown and discussed in terms of a standard liquid crystal display panel 100. However, it should be understood that the illustration of the liquid crystal panel shown in FIG. 1 also encompasses a target liquid crystal display panel 100', as well as various components, for example, the pad unit 150' and others, as also depicted in FIG. 4. Moreover, it is understood that the driving unit 140 can be otherwise be located or connected to the panel 100.

Figure 2:
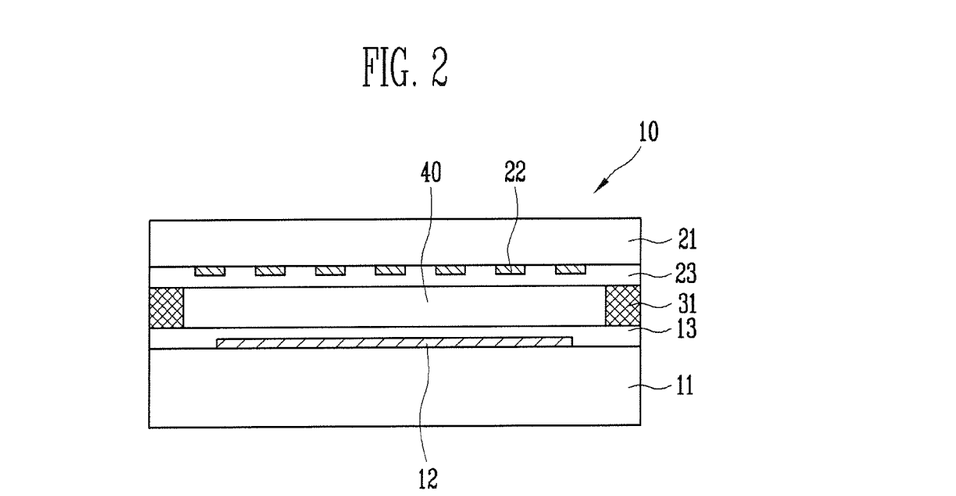
FIG. 2 is a cross sectional view schematically illustrating a passive matrix type liquid crystal display panel according to an aspect of the present invention.

FIG. 2 is a cross sectional view schematically illustrating a passive matrix type liquid crystal display panel 10 according to an aspect of the present invention. The liquid crystal display panel 10 includes a lower substrate 11 and an upper substrate 21. The lower substrate 11 includes a first electrode 12 formed thereon in a first direction. One entire side of the lower substrate 11 includes the first electrode 12 that includes a first orientation film 13 to orient liquid crystal molecules in a predetermined direction.

The upper substrate 21 includes a second electrode 22 formed thereon in a second direction to be crossing the first electrode 12. One entire side of the upper substrate 21 includes the second electrode 22 that includes a second orientation film 23 to orient the liquid crystal molecules in a predetermined direction. The upper substrate 21 is positioned over an upper part of the lower substrate 11. The lower substrate 11 and the upper substrate 21 are spaced apart from each other by a spacer (not shown), and are sealed by a sealing agent 31. A liquid crystal layer 40 is injected between the lower substrate 11 and the upper substrate 21.

Figure 3:
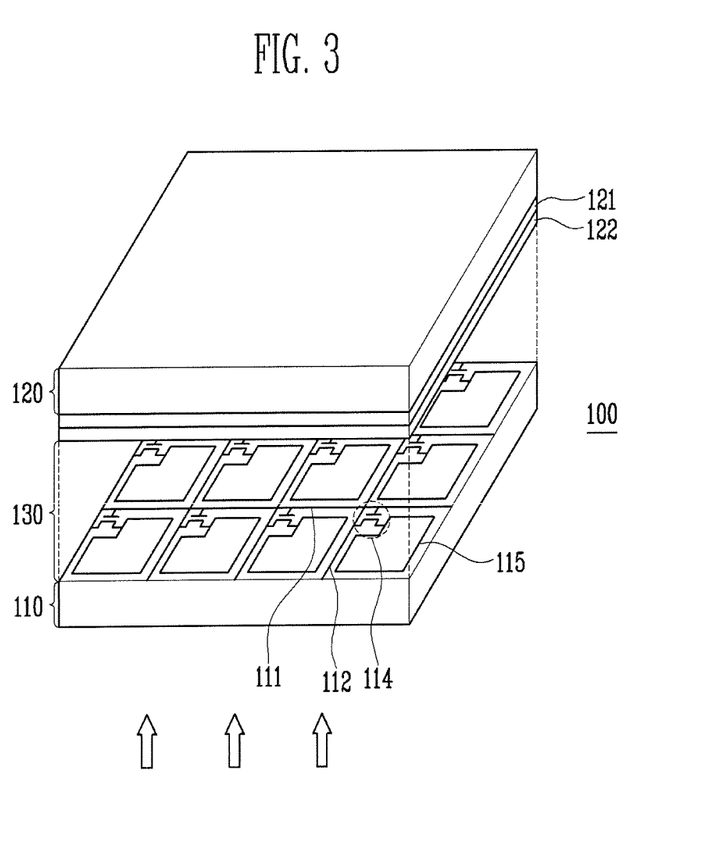
FIG. 3 is a perspective view schematically illustrating an active matrix type liquid crystal display panel according to an aspect of the present invention.

FIG. 3 is a perspective view schematically illustrating a pixel region in an active matrix type liquid crystal display panel 100 according to an aspect of the present invention. In FIG. 3, a plurality of gate lines 111 and data lines 112 are arranged in a matrix layout on the lower substrate 110 and a plurality of pixels is defined by the gate lines 111 and the data lines 112, which are crossing each other. A thin film transistor 114 to control a signal supplied to each pixel, and a first electrode 115, which is made with a transparent material and is connected to the thin film transistor 114, are formed in a part of the lower substrate 110 in which the gate lines 111 and the data lines 112 are crossing each other.

A second electrode 122 including a color filter 121 is formed on the upper substrate 120, which is formed by repeating red, green, and blue pixel portions, corresponding to each pixel. The color filter 121 is made with a transparent material. The lower substrate 110 and the upper substrate 120 are arranged to be opposite to each other and are bonded by a sealing agent (not shown). A liquid crystal layer 130 is injected into the pixel region P between the sealed lower substrate 110 and the upper substrate 120. In the aspects of the present invention shown in FIGS. 2 and 3, although not shown in the drawings, a polarizing plate is disposed in one of the sides (referred to as a back side) of the lower substrates 11 and 110 and the upper substrates 21 and 120, and a back light unit (205 shown in FIG. 4) is provided into a part (referred to as a lower part) of the polarizing plate as a light source.

In the liquid crystal display devices 10, 100 as configured above, light provided from the back light, which is provided in the back of the lower substrate 11 and 110, is incident on the liquid crystal layer 40 and 130, respectively. The liquid crystal display devices 10, 100 display characters, letters, and/or images due to the light, which passes through the upper substrates 21 and 120 after being optically modulated by liquid crystals that are oriented by a voltage (or operating voltage) applied to the first electrodes 12 and 115 and the second electrodes 22 and 122. In aspects of the present invention, brightness of the liquid crystal display devices, panels, or portions thereof, are modulated or controlled by the operating voltage applied to the various first or the second electrodes, for example.

FIG. 4 is a schematic view illustrating a device to optimize a brightness of the liquid crystal display panel 10, 100 according to an aspect of the present invention. The brightness optimizing device includes a plate 200 to selectively mount a standard (or calibrated) liquid crystal display panel 100 or a target liquid crystal display panel 100' for light measurement. A back light 205 supplies light to the liquid crystal display panel 100 (or 100'). A connecting unit 210 is connected to the pad unit 150 (or 150') of the liquid crystal display panel 100 (or 100'). A detecting unit 220 produces a brightness signal by detecting a brightness of a predetermined region of the liquid crystal display panel 100 (or 100'). An amplifying unit 230 amplifies the brightness signal provided by the detecting unit 220. A converting unit 240 converts the brightness signal into a brightness data. A comparative unit 250 stores a standard (calibrated or adjusted) data and compares the brightness data with the standard data. A processing unit 260 produces an operation voltage according to a result signal provided by the comparative unit 250 and to provide the operation voltage to the connecting unit 210. In various aspects, the standard, calibrated, or adjusted data may be a plurality of data, and the operating voltage may be a plurality of voltages.

The back light 205 and the connecting unit 210 may be formed on or built in the plate 200. The detecting unit 220 includes an optical sensor 221 to concentrate a light and to detect a brightness thereof, and a driving unit 222 to support and transfer (or maneuver) the optical sensor 221. Also, the converting unit 240 includes an analog to digital converter (A/D Converter) among others and converts an analog brightness signal into a digital brightness data.

Figure 5:
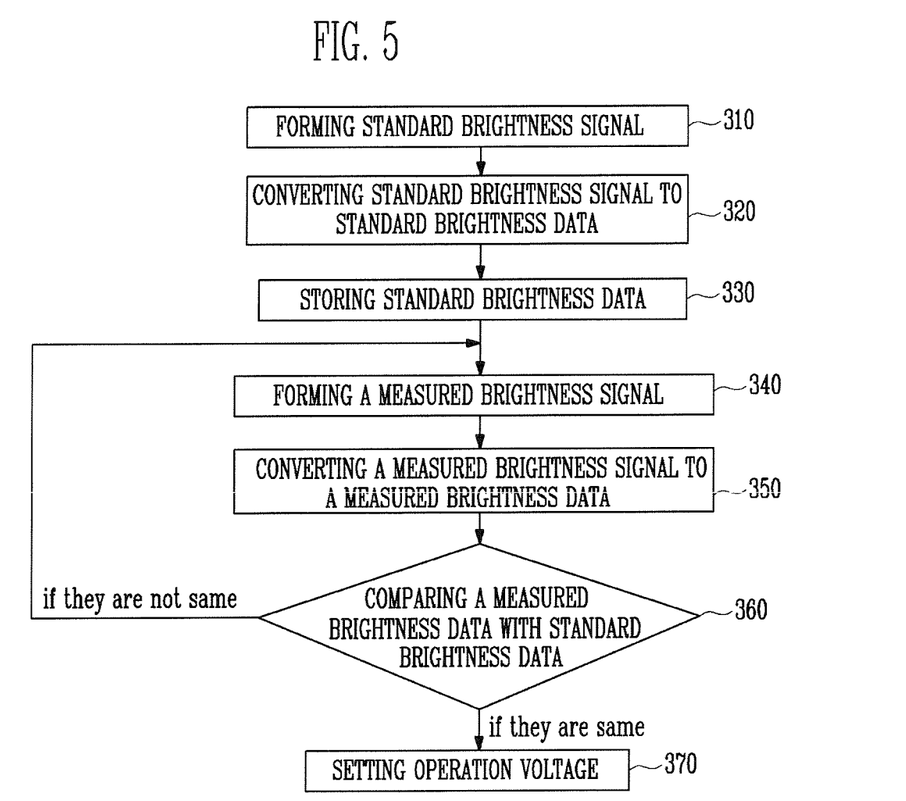
FIG. 5 is a flow chart illustrating a method of optimizing a brightness of a liquid crystal display panel of FIG. 4.

FIG. 5 is a flow chart illustrating a method of optimizing a brightness of a liquid crystal display panel of FIG. 4. In the non-limiting aspect shown, the standard liquid crystal display panel 100 is disposed on the plate 200. The pad unit 150 thereof is connected to the connecting unit 210. The standard liquid crystal display panel 100 may be prepared or fabricated beforehand to act as a liquid crystal display panel which emits an optimum brightness of light to be a standard measure of brightness in measuring the brightness of other liquid crystal display panel (or the target liquid crystal display panel 100'). For example, the optimum brightness of the standard liquid crystal display panel 100 may be established by an expert or an experience adjuster through several processes which apply each of the different operation voltages to the standard liquid crystal display panel 100. In other aspects, the standard liquid crystal display panel 100 may be optimized by automation.

In the aspect shown, light is provided to the standard liquid crystal display panel 100 from the back light 205, and the detecting unit 220 is moved to a predetermined place, position, or region of the standard liquid crystal display panel 100. When this occurs, the processing unit 260 provides a video signal and a standard operation voltage to be measured to the pad unit 150 through the connecting unit 210. Then, the detecting unit 220 detects the brightness of the predetermined region thereof and produces a standard brightness signal of the standard liquid crystal display panel 100, in operation 310. The amplifying unit 230 amplifies the standard brightness signal provided by the detecting unit 220, and the converting unit 240 converts the amplified standard brightness signal into a standard brightness data, in operation 320. The comparative unit 250 receives the standard brightness data from the converting unit 240 and stores the standard brightness data, in operation 330.

Next, a target liquid crystal display panel 100' to be measured (or adjusted) is disposed on the plate 200, and the connecting unit 210 is connected to a pad unit 150' of the target liquid crystal display panel 100'. The target liquid crystal display 100 can be provided during manufacture at a common location, or after manufacture at another location at which setting and verification is performed. Light is provided by the back light 205 to the target liquid crystal display panel 100' to be measured. The detecting unit 220 is moved to a predetermined region of the target liquid crystal display panel 100'. As shown, the processing unit 260 provides to the pad unit 150' a video signal and an initial operation voltage to be measured through the connecting unit 210. The detecting unit 220 detects the brightness of a predetermined region of target liquid crystal display panel 100' and produces a measured brightness signal of target liquid crystal display panel 100', in operation 340.

In operations 310 and 340, the detecting unit 220 detects the brightness of the target liquid crystal display panel 100' by concentrating light which is within a sight angle range of ±10° or below. In various aspects, the sight angle range is preferably from ±5° to ±10°. In the aspect shown, if the sight angle of the concentrating light is smaller than ±5°, accuracy and uniformity of a detected brightness may be low. On the other hand, if the sight angle of the concentrating light is larger than ±10°, accuracy of the detected brightness may also be low due to a brightness difference caused by the amount of light being diffused over a large area. In various aspects, the sight angle is relative to a direction perpendicular to the liquid crystal display panel 100 or 100', though not required. In various aspects, the video signal, the operating voltage, the standard operating voltage, and/or the initial operating voltage (and/or the signals represented thereby) adjusts or modulates light emission or transmission of the liquid crystals, and are applicable to various electrodes. Moreover, other sight angles can be used in other aspects and for other testing conditions.

Figure 6A:
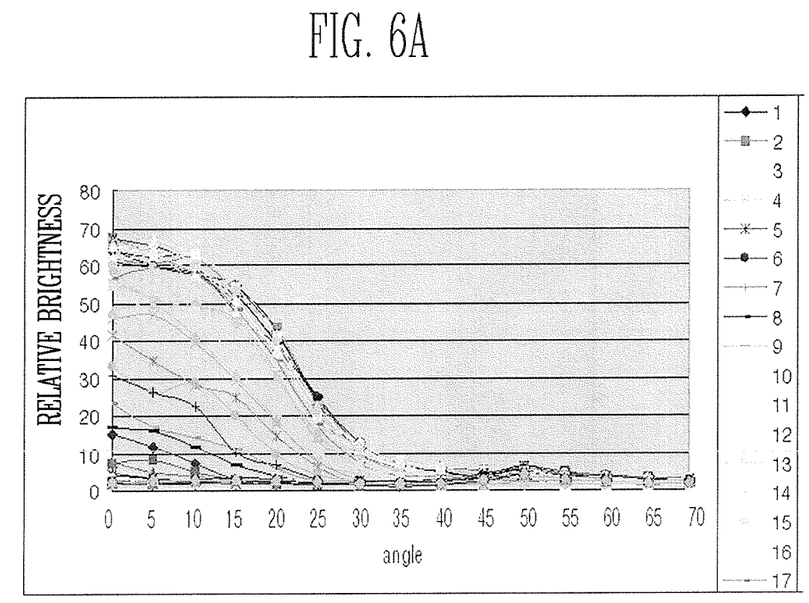
FIGS. 6A and 6B are graphs illustrating a change of brightnesses according to angles of sight according to aspects of the present invention.
Figure 6B:
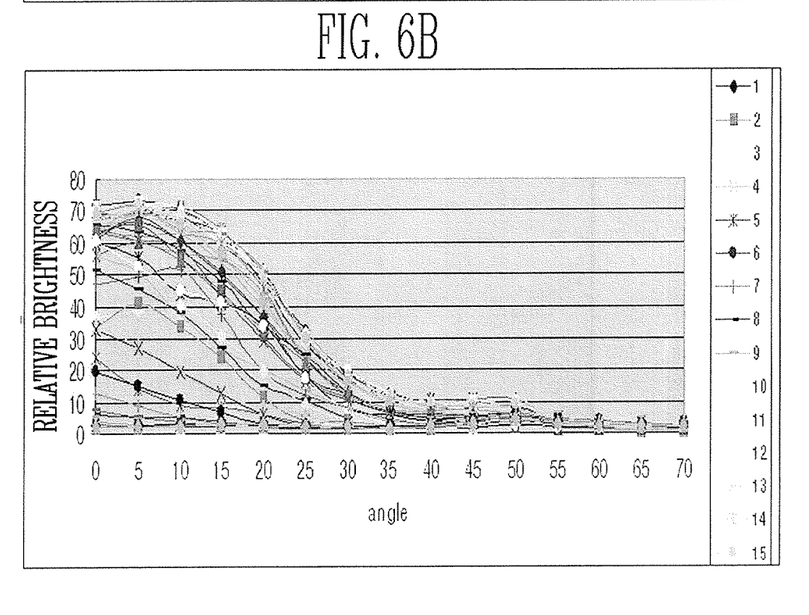

FIGS. 6A and 6B are graphs illustrating a change of brightness according to an angle of sight (or sight angle). FIG. 6A is a brightness change of the color black and FIG. 6B is a brightness change of the color white. As shown in FIGS. 6A and 6B, a brightness drops suddenly in the liquid crystal display panel 100 or 100' when an angle of sight of the concentrating light is bigger (or greater) than ±10°, and decrease the accuracy of a detected (or measured) brightness due to a difference of the amount of detected (or measured) light.

In the aspect shown, the amplifying unit 230 amplifies the measured brightness signal provided by the detecting unit 220, and the converting unit 240 converts the amplified measured brightness signal into a measured brightness data, in operation 350. The comparative unit 250 receives the measured brightness data from the converting unit 240 and compares the measured brightness data with the standard brightness data. After the comparison, a result signal of the comparison is transferred to the processing unit 260, in operation 360.

In the aspect shown, the comparative unit 250 causes or controls the processing unit 260 to store an operation voltage to the driving unit 140 of the target liquid crystal display panel 100' when the measured brightness data is the same (or substantially the same) as the standard brightness data. That is, if the measured brightness is the same (or substantially the same) as the standard brightness, the operation voltage at that time is established or set as the operation voltage of the target liquid crystal display panel 100', in operation 370.

However, the processing unit 260 produces the operation voltage according to the difference and produces the result signal to provide the result signal to the target liquid crystal display panel 100' to be measured if the measured brightness is different from the standard brightness. That is, if the measured brightness is lower than the standard brightness, an operation voltage higher than an initial operation voltage (which is also referred to as another operating voltage) is provided to the target liquid crystal display panel 100'. If the measured brightness is higher than the standard brightness, an operation voltage lower than the initial operation voltage is provided to the liquid crystal display panel 100'. Therefore, operations 340 to 360 are repeated using the adjusted operating voltage. In various aspects, the another operating voltage corresponds to a difference in a brightness between the measured brightness and the standard brightness, or corresponds to the result signal.

While described in terms of obtaining and storing the standard brightness data in one continuous method, it is understood that the standard brightness data could be preloaded based on data obtained separately such that operations 310-320 are not performed, or are performed using a separate device such that operation 330 is not performed.

As described above, aspects of the present invention detect the optimum brightness of the target liquid crystal display panel by measuring the brightness thereof while varying the operation voltage of the target liquid crystal display panel manufactured in the production or the fabrication process, and establishes, calibrates, or adjusts the operation voltage at that time to be the operation voltage of the target liquid crystal display panel. Accordingly, accuracy of the measurement, the calibration, or the adjustment, and uniformity of the quality may be improved by detecting the brightness of the target liquid crystal display panel using a concentrated light whose sight angle range is ±10° or below or lower, and taking account of a property or properties of the liquid crystal display panel. Further, aspects of the present invention may improve the productivity in fabrication of the liquid crystal display panels because optimum brightness thereof is quickly and accurately detected through a fast feedback process.

In aspects of the present invention, the illustrations of the liquid crystal panels as shown and discussed are of a standard liquid crystal display panel and of a target liquid crystal display panel, as well as various components thereof.

In various aspects, the standard brightness may be stored for later retrieval, or may be obtained and used concurrently as the comparison is being performed.

Various components of the device to optimize the brightness as shown in FIG. 4, such as the amplifying unit 230, the converting unit 240, the comparative unit 250, and/or the processing unit 260, can be integrated into a single control unit or a processor, or alternatively, can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the input voltage to modulate the light is varied according characteristics of the liquid crystal display panel and the characteristics include non-uniform thicknesses of the liquid crystal display panel depending on a material, a process variable, and/or various errors. Also, in various aspects, the liquid crystal display panel includes liquid crystals that are controlled by the input voltage.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A device which optimizes brightness of a liquid crystal display panel, the device comprising:
   a plate on which to place a target liquid crystal display panel subject to optimization;
   a back light configured to provide light to the target liquid crystal display panel;
   a connecting unit configured to connect to a pad unit of the target liquid crystal display panel;
   a detecting unit comprising an optical sensor placed over the target liquid crystal display panel and configured to produce brightness data of the target liquid crystal display panel being illuminated by the provided light, wherein the optical sensor is configured to detect brightness of light that passes through a portion of the target liquid crystal display panel under the optical sensor, the optical sensor having a maximum sight angle of 5° to 10°;

a comparative unit configured to compare the brightness data of the target liquid crystal display panel with a standard brightness data of a standard liquid crystal display panel that is different from the target liquid crystal display panel subject to optimization; and a processing unit configured to produce an operation voltage for the target liquid crystal display panel based on the comparison of the brightness data with the standard brightness data.

2. The device to optimize the brightness of a liquid crystal display panel according to claim 1, wherein the back light and the connecting unit are provided in the plate.

3. The device to optimize brightness of a liquid crystal display panel according to claim 1, wherein the detecting unit includes an optical sensor to detect the brightness of the predetermined region by concentrating the light, and a driving unit to support and maneuver the optical sensor.

4. The device to optimize the brightness of a liquid crystal display panel according to claim 1, wherein the standard brightness data is obtained by detecting brightness of the standard liquid crystal display panel.

5. The device to optimize the brightness of a liquid crystal display panel according to claim 1, wherein the processing unit is configured to store the operation voltage in a driving unit of the target liquid crystal display panel if the brightness data is the same as the standard brightness data.

6. The device to optimize the brightness of a liquid crystal display panel according to claim 1, wherein the detecting unit is further configured to obtain a brightness signal by detecting the brightness, amplify the brightness signal and convert the amplified signal into the brightness data.

7. A method of optimizing brightness of a liquid crystal display panel comprising:

providing standard brightness data of a standard liquid crystal display panel;

producing a measured brightness data of a target liquid crystal display panel, wherein producing comprises detecting brightness of light emitted from a portion of the target liquid crystal display panel an optical sensor, the optical sensor having a maximum sight angle of 5° to 10°;

comparing the measured brightness data of the target liquid crystal display panel against the standard brightness data of the standard liquid crystal display panel that is different from the target liquid crystal display panel; and storing an operation voltage corresponding to the measured brightness data into a driving unit of the target liquid crystal display panel if the measured brightness data and the standard brightness data are the same.

8. The method of claim 7, further comprising:

providing another operation voltage obtained based on a difference between the measured brightness data and the standard brightness data to the target liquid crystal display panel if the measured brightness data and the standard brightness data are not the same, and producing another measured brightness data.

9. A device to optimize brightness of a liquid crystal display panel, comprising:

a detector configured to detect brightness of light emitted from a portion of a target liquid crystal display panel under the detector, the detector having a maximum sight angle of 5° to 10°, the brightness of the light corresponding to an input voltage to modulate the light;

a processor to store data of a standard brightness of a standard liquid crystal display panel, to compare the detected brightness of the target liquid crystal display panel relative to the standard brightness of the standard liquid crystal display panel that is different from the target liquid crystal display panel, to selectively set the input voltage as an operating voltage of the target liquid crystal display panel if the detected brightness is substantially identical to the standard brightness of the standard liquid crystal display panel based on the comparison, and to selectively change the input voltage by an amount corresponding to a difference between the detected brightness and the standard brightness if the detected brightness is not substantially identical to the standard brightness.

10. The device to optimize brightness of a liquid crystal display panel according to claim 9, wherein the input voltage to modulate the light is varied according characteristics of the target liquid crystal display panel.

11. The device to optimize brightness of a liquid crystal display panel according to claim 10, wherein the characteristics include non-uniform thicknesses of the target liquid crystal display panel depending on a material, a process variable, and/or various errors.

12. The device to optimize brightness of a liquid crystal display panel according to claim 9, wherein the target liquid crystal display panel comprises liquid crystals that are controlled by the input voltage.

13. The device to optimize brightness of a liquid crystal display panel according to claim 12, wherein the target liquid crystal display panel further comprises a plurality of electrodes, and the input voltage is applied to the plurality of the electrodes.

14. A method of optimizing brightness of a liquid crystal display panel, comprising:

providing data of a standard brightness detected from a standard liquid crystal display panel;

detecting brightness of light emitted from a portion of a target liquid crystal display panel under a detector, the detector having a maximum sight angle of 5° to 10°, the brightness of the light corresponding to an input voltage to modulate the light;

comparing the detected brightness of the target liquid crystal display panel relative to the standard brightness of the standard liquid crystal display panel that is different from the target liquid crystal display panel;

selectively setting the input voltage as an operating voltage of the target liquid crystal display panel if the detected brightness is substantially identical to the standard brightness; and selectively changing the input voltage by an amount corresponding to a difference between the detected brightness and the standard brightness if the detected brightness is not substantially identical to the standard brightness.

15. The method of optimizing brightness of a liquid crystal display panel according to claim 14, wherein the input voltage to modulate the light is varied according characteristics of the target liquid crystal display panel.

16. The method of optimizing brightness of a liquid crystal display panel according to claim 15, wherein the characteristics include non-uniform thicknesses of the target liquid crystal display panel depending on a material, a process variable, and/or various errors.

17. A liquid crystal display panel device, the device comprising:

a liquid crystal display panel; and a controller which drives the panel to form an image of an operating voltage, wherein the operating voltage is set to achieve a standardized brightness according to the method of claim 14.

* * * * *